United States Patent
Park

(10) Patent No.: US 8,774,873 B2
(45) Date of Patent: Jul. 8, 2014

(54) INPUT AND OUTPUT HALL STRUCTURE FOR SOUND DEVICE IN A PORTABLE TERMINAL

(71) Applicant: Samsung Electronics Co., Ltd., Gyeonggi-do (KR)

(72) Inventor: Jung-Sik Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/887,639

(22) Filed: May 6, 2013

(65) Prior Publication Data
US 2013/0244738 A1    Sep. 19, 2013

Related U.S. Application Data

(63) Continuation of application No. 12/723,820, filed on Mar. 15, 2010, now Pat. No. 8,437,811.

(30) Foreign Application Priority Data

Mar. 20, 2009 (KR) ........................ 10-2009-0023784

(51) Int. Cl.
 *H04M 1/00* (2006.01)

(52) U.S. Cl.
USPC ...................................................... 455/569.1

(58) Field of Classification Search
USPC ............ 455/550.1, 569.1, 575.1–575.3, 347, 455/350, 351; 381/346, 347, 354
See application file for complete search history.

(56) References Cited

U.S. PATENT DOCUMENTS 7,450,976 B2 * 11/2008 Hoshijima ................. 455/575.1
2007/0049357 A1    3/2007 Daimon et al.

* cited by examiner

*Primary Examiner* — Thanh Le
(74) *Attorney, Agent, or Firm* — Cha & Reiter, LLC

(57) ABSTRACT

An input/output hall structure for a sound device in a portable terminal includes a main hole and a plurality of sub-holes. The main hole is provided in a case frame forming the exterior of the portable terminal to be exposed to the exterior, and inputs/outputs sound. The plurality of sub-holes is branched from the main hole and communicates with the main hole. The sub-hole and a corresponding sound device communicate sound. The structure reduces the number of holes for inputting/outputting sound of a sound device and provides a more elegant appearance with improved function. A plurality of sound devices can input/output through the main hole and branched configuration of sub-holes.

20 Claims, 4 Drawing Sheets

INPUT AND OUTPUT HALL STRUCTURE FOR SOUND DEVICE IN A PORTABLE TERMINAL

CLAIM OF PRIORITY

This is a Continuation of U.S. application Ser. No. 12/723,820 filed on Mar. 15, 2010 which in turn claims the benefit of priority under 35 U.S.C. §119 from patent application Serial No. 10-2009-00023784 filed in the Korean Intellectual Property Office on Mar. 20, 2009, the contents of which are incorporated by reference in its entirety.

BACKGROUND OF THE INVENTION

1. Field of the Invention

The present invention relates to a case frame defining outer surface of a portable terminal More particularly, the present invention relates to an input/output hall structure (or space structure) for a sound device in a portable terminal that provides an elegant appearance and facilitates the input and output of sound.

2. Description of the Related Art

In recent years, portable terminals such as cellular phones, etc. have gone from being luxuries to becoming necessities in our lives, and their popularity is worldwide. Users can acquire various visual information, sound information, etc. through the portable terminals. Manufacturers are endeavoring to meet users' every increasing requirements that with each advancement increases a level of dependence of users on such portable terminals. The portable terminal provides various multimedia functions such as Digital Multimedia Broadcasting (DMB) viewing, the wireless Internet, etc. besides a basic telephone function.

More particularly, the portable terminal includes a variety of sound devices for inputting or outputting sound at a time when the telephone and multimedia functions are enabled. The portable terminal typically includes a hole in a case frame defining outer surface of the portable terminal to input/output sound to/from the sound device, such sound device typically being a transducer.

FIG. 1 illustrates a hall structure for inputting/outputting sound about a sound device of a portable terminal according to the conventional art. Hereinafter, the hall structure will be substantially considered as a space structure to flow a sound.

Referring now to FIG. 1, the portable terminal typically includes a receiver for outputting voice at the time of a call with a called party, and a microphone for inputting voice. Further, the portable terminal includes a speakerphone for outputting a high quality of sound at the time of execution of a multimedia function. Also, in recent years, the portable terminal includes a separate microphone for capturing ambient noise besides the microphone for inputting the user's voice, thus being capable of acquiring a higher quality of user's voice. Commonly, each of the sound devices are installed close to a user's mouth or ear at a time a user makes a call. Accordingly, it can be said that the construction position of the sound devices is limited to some degree. Also, the sound device (e.g., the receiver, the microphone, the speakerphone, etc.) has a hall structure 10 for inputting/outputting sound through each of holes 12, 13, and 14 that are exposed and provided in a case frame 11 of the portable terminal Thus, when more sound devices are constructed, the portable terminal should construct as many input/output holes as the number of the sound devices in the case frame defining outer surface of the portable terminal All of these holes makes are unsightly and detracts from the appearance of the portable terminal Also, when a corresponding hole is blocked because of user's carelessness, etc., the portable terminal cannot input/output sound as it was designed.

SUMMARY OF THE INVENTION

The present invention provides an input and an output hall structure for a sound device in a portable terminal that combines both sound input and output in a plurality of sound devices provided in the portable terminal.

An exemplary aspect of the present invention is to provide an input/output hall structure for a sound device in a portable terminal for inputting/outputting sound of a plurality of sound devices provided in the portable terminal, and providing an elegant appearance.

Another exemplary aspect of the present invention is to provide an input/output hall structure for a sound device in a portable terminal by combining a hole of a receiver or a speaker and a hole of a microphone, by preventing generation of an additional hole, providing an elegant appearance, and for reducing blocking of the hole of the microphone in the portable terminal.

In accordance with an exemplary aspect of the present invention, an input/output hall structure for a sound device in a portable terminal preferably includes: a main hole and a plurality of sub-holes; the main hole is provided in a case frame forming the exterior of the portable terminal and is exposed to the exterior for inputting/outputting sound. The plurality of sub-holes is branched from the main hole and communicates with the main hole. The sub-hole and a corresponding sound device communicate sound.

Other exemplary aspects, advantages and salient features of the invention will become more apparent to those skilled in the art from the following detailed description, which, taken in conjunction with the annexed drawings, discloses exemplary embodiments of the invention in more detail.

BRIEF DESCRIPTION OF THE DRAWINGS

The above and other exemplary objects, features and advantages of the present invention will become more apparent from the following detailed description when taken in conjunction with the accompanying drawings in which.

Throughout the drawings, like reference numerals will be understood to refer to like parts, components and structures.

DETAILED DESCRIPTION

The following description, with reference to the accompanying drawings, is provided to assist a person of ordinary skill in the art with a comprehensive understanding of exemplary embodiments of the present invention as defined by the appended claims The description includes various specific details to assist in that understanding, but these details are to be regarded as merely exemplary. Accordingly, those of ordinary skill in the art will recognize that various changes and modifications of the exemplary embodiments described herein can be made without departing from the scope and spirit of the invention as defined by the appended claims Also, descriptions of well-known functions and constructions may be omitted for conciseness and so as not to obscure appreciation of the present invention by a person of ordinary skill with such well-known functions and constructions.

The terms and words used in the following description and claims are not limited to the bibliographical meanings, but, are merely used by the inventor to enable a clear and consistent understanding of the invention as understood by a person of ordinary skill in the art. Accordingly, it should be apparent to those skilled in the art that the following description of exemplary embodiments of the present invention are provided for illustration purpose only and not for the purpose of limiting the invention as defined by the appended claims.

It is to be understood that the singular forms "a", "an", and "the" include plural references unless the context clearly dictates otherwise. Thus, for example, reference to "a component surface" typically includes reference to one or more of such surfaces.

By the term "substantially" typically means that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Preferred exemplary embodiments of the present invention will now be described below with reference to the accompanying drawings.

The present invention discloses a technology for an input/output hall structure for a sound device in a portable terminal, for combining both input and output of sound of a plurality of sound devices in the portable terminal.

Figure 2:
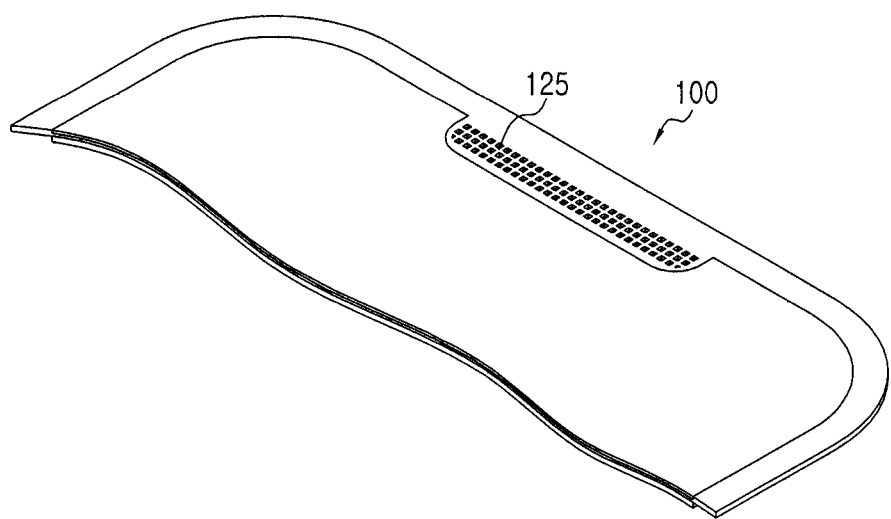
FIG. 2 is a perspective view illustrating a hall structure for combining both input and output of sound of sound devices in a portable terminal according to an exemplary embodiment of the present invention.

FIG. 2 is a perspective view illustrating a hall structure for combining both input and output of sound of sound devices in a portable terminal according to an exemplary embodiment of the present invention. Hereinafter, the hall structure will be substantially considered as a space structure.

Figure 1:
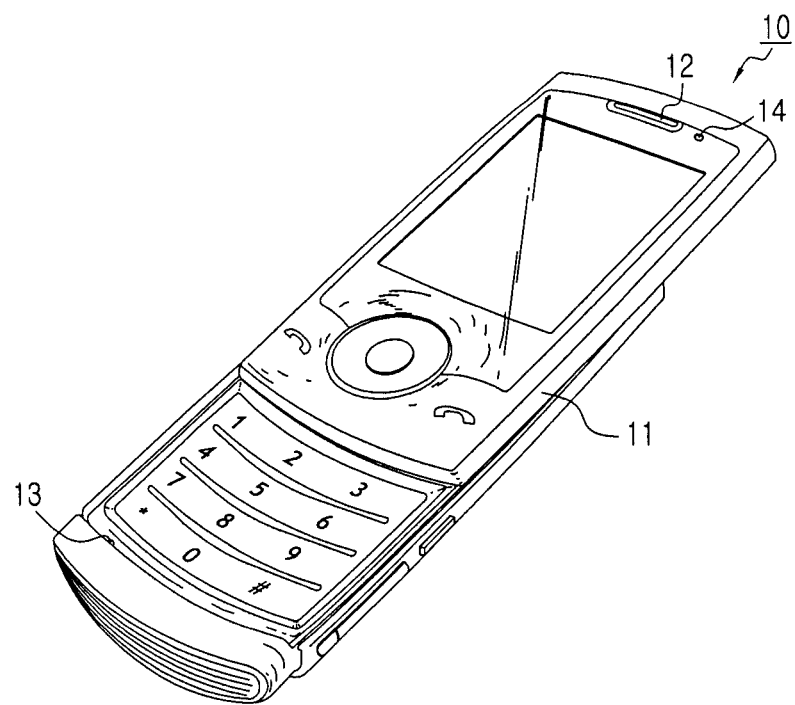
FIG. 1 is a diagram illustrating a hall structure for inputting and outputting sound in a sound device of a portable terminal according to the conventional art.

Referring now to FIG. 2, the hall structure 100 has a single hole (main hole) 125 exposed to the exterior environment. Through the main hole 125, the Hall structure 100 can output sound from a receiver or speakerphone and input sound to a microphone. Unlike a conventional hall structure of FIG. 1 configured to have a plurality of holes corresponding to each sound device, respectively, the Hall structure 100 according to the present invention inputs/outputs sound to/from a plurality of sound devices through the main hole 125. When a hole of a microphone is blocked, the conventional hall structure deteriorates a quality of transmission sound at the time of a call. Unlike the conventional art, the hall structure 100 according to the present invention can better reduce blocking of a hole of a microphone by combining the hole of the microphone and a hole of a speakerphone or receiver.

Furthermore, compared to the conventional art, the hall structure 100 according to the present invention has elegant appearance by configuring the single hole 125 exposed to the exterior for the plurality of sound devices such as the receiver, the speakerphone, the microphone, etc.

Figure 3:
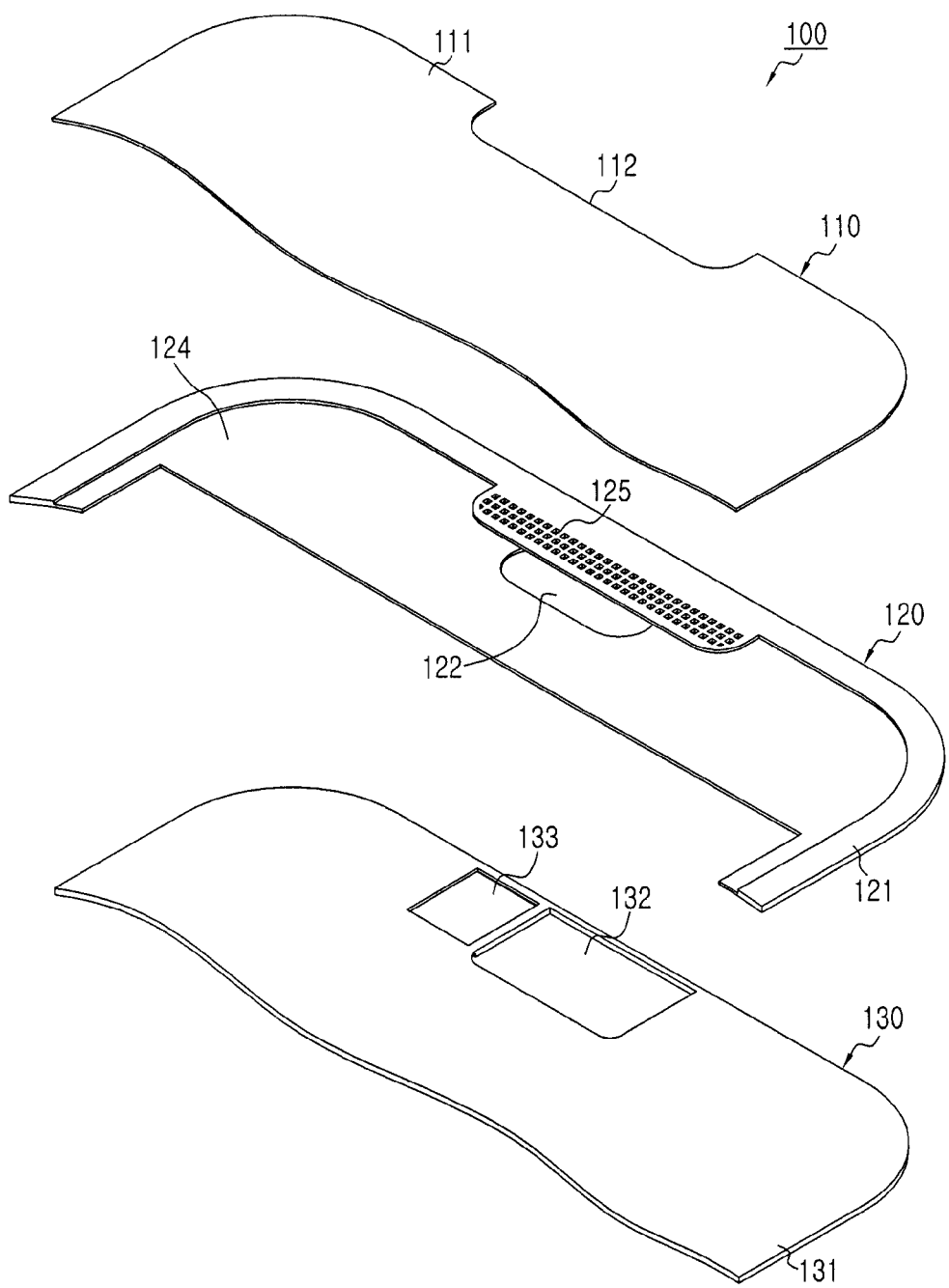
FIG. 3 is an exploded view in perspective illustrating a hall structure according to an exemplary embodiment of the present invention.

FIG. 3 is an exploded perspective view illustrating a hall structure according to an exemplary embodiment of the present invention.

Referring now to FIG. 3, the hall structure 100 according to the exemplary embodiment of the present invention includes a first plate 110 and a second plate 120. The second plate 120 is fixed to a lower part of the first plate 110 and exposes the main hole 125 to the exterior. The main hole 125 introduces and discharges sound. The hall structure 100 further includes a third plate 130. The third plate 130 is fixed to a lower part of the second plate 120 and forms a path of sound that is output from a receiver or speakerphone (not shown) and a path of sound that is input to a microphone.

The first plate 110 preferably includes a body 111 and a through-hole 112. The through-hole 112 is provided in the body 111, and exposes the main hole 125 when the first plate 110 is coupled with the second plate 120.

Figure 4:
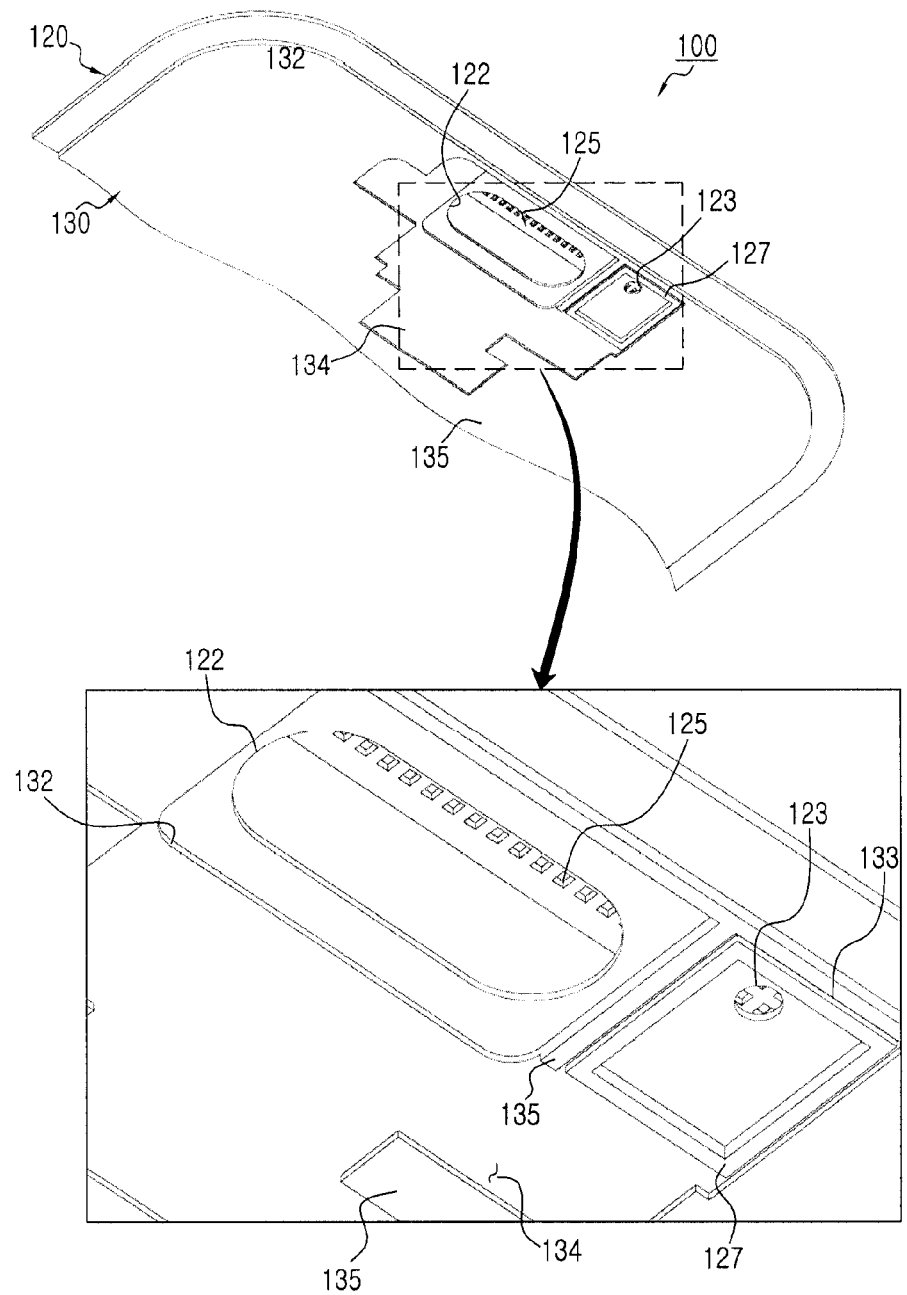
FIG. 4 is a rear perspective view illustrating a hall structure according to an exemplary embodiment of the present invention.

The second plate 120 includes a body 121 and a recess groove 124. The recess groove 124 is provided in the body 121 and is step-formed to safely mount the first plate 110. The second plate 120 further includes the main hole 125, a first sub-hole 122, and a second sub-hole 123 (FIG. 4). The main hole 125 is provided in the body 121 and has a combination of a plurality of through-holes. As shown in FIG. 3, the main hole may be comprised of a plurality of through-holes. Furthermore, the main hole may be comprised of a single through-hole. The first and second sub-holes 122 and 123 are branched from the main hole 125 and through-pass to a bottom. For example, sound output from the receiver or speakerphone can be discharged from the first sub hole-122 to the external by way of the main hole 125. Also, external sound can be introduced to the microphone from the main hole 125 by way of the second sub-hole 123. The first plate 110 and second plate 120 can be formed as one.

The third plate 130 includes a body 131 and passages 132 and 133. The passages 132 and 133 are formed in the body 131 and, when the third plate 130 is coupled with the second plate 120, communicate with the first and second sub holes 122 and 123, thus delivering sound output from a sound device and sound input to a sound device, to the first and second sub-holes 122 and 123.

Particularly, a common level of sensitivity of the microphone ranges from about −42 dB to −44 dB, and is high enough to deliver a user's voice to a called party even through a small hole. Accordingly, although part of a hole of a conventional receiver or speakerphone is combined with a hole of the microphone, it has no influence on an amount of sound of the receiver or speakerphone. This reduces the number of holes, making the appearance elegant. However, for the sake of a combined hole, it is required to prevent echo and howling of repeating a process in which sound is output from the receiver or speakerphone and is input to and amplified in the microphone. Thus, it is desirable to separate a sound delivery space of the receiver or speakerphone from a sound delivery space of the microphone. An example of such structure is described below with reference to FIG. 4.

FIG. 4 is a rear perspective view illustrating a hall structure according to another exemplary embodiment of the present invention.

Referring now to FIG. 4, the third plate 130 includes an indented part 134 depressed to safely mount a corresponding sound device. The passages 132 and 133 are formed by a void space that results from coupling between a portion 135 except for the indented part 134 and other constituent elements such as a Printed Circuit Board (PCB) (not shown). The depiction in FIG. 4 is exemplary and the present invention is not limited in scope to what is shown in FIG. 4. The passages 132 and 133 may also comprise ducts for communicating at one end with a corresponding sound device, and communicating at the other end with the first sub-hole 122 of the second plate 120. The duct type passages 132 and 133 may input sound to a sound device much far away from the first sub hole 122 or may output sound from a sound device far away from the first sub-hole 122. The arrangement of passages 132 and 133 can provide a solution to a problem that the plurality of sound devices such as the receiver or speakerphone, the microphone, etc. are installed in a narrow space, thus causing the one-sided mounting of at least any one sound device.

The second plate 120 includes the first and second sub-holes 122, 123 that are separated from the main hole 125. Further, the second plate 120 may include a fence 127. The fence 127 passes through the passage 133 of the third plate 130 and communicates with the second sub-hole 123. The fence 127 may house a corresponding sound device. For instance, the fence 127 may house a microphone. Particularly, as above, the hall structure of the present invention may further include a cover or shield chamber for sealing the fence 127 or housing the microphone to prevent echo and howling. That is, the fence 127 and the cover isolate the sound delivery space of the receiver or speakerphone from the sound delivery space of the microphone. More desirably, the passages 132 and 133 are separated and formed correspondingly to the first and second sub-holes 122,123 in order to prevent mutual communication. Accordingly, after being input to the fence 127 from the main hole 125 of the second plate 120 by way of the second sub-hole 123, external sound is input to the microphone within the fence 127.

In conclusion, an input/output hall structure for a sound device in a portable terminal according to an exemplary embodiment of the present invention reduces the number of holes for inputting or outputting sound of the sound device, making the appearance more elegant than known heretofore. Also, the input/output hall structure combines a hole of a receiver or speakerphone and a hole of a microphone, thus being capable of reducing blockage of the hole of the microphone.

While the invention has been shown and described with reference to certain preferred exemplary embodiments thereof, it will be understood by those skilled in the art that various changes in form and details may be made therein without departing from the spirit and scope of the invention as defined by the appended claims and their equivalents. Therefore, the scope of the invention is defined not by the detailed description of the invention but by the appended claims, and all differences within the scope will be construed as being included in the present invention.

What is claimed is:

1. A case frame comprising:
    a main hole portion including a first plurality of holes in a first plate of the case frame;
    a second plurality of holes branched from the main hole portion and communicating with the main hole portion in the first plate;
    a third plurality of holes corresponding to the second plurality of holes in a second plate of the case frame; and
    at least one chamber formed between the second plate of the case frame and a board disposed below the second plate of the case frame, the at least one chamber comprising a first passage formed by a first one of the third plurality of holes and a second passage formed by a second one of the third plurality of holes; and
    wherein a first sound device and a second sound device are disposed in the at least one chamber, the first sound device being configured to communicate with the main hole portion via the first passage and the second sound device being configured to communicate with the main hole portion via the second passage.

2. The case frame of claim 1, wherein the at least one chamber communicates with the third plurality of holes.

3. The case frame of claim 1, wherein the least one chamber is disposed on the second plate.

4. The case of frame of claim 1, wherein the first sound device includes a speaker and the second sound device includes a microphone.

5. The case frame of claim 1, wherein the at least one chamber comprises an indented part formed at the second plate, communicating with the third plurality of holes, and housing the first sound device.

6. The case frame of claim 1, wherein the at least one chamber is formed by a coupling between the board and the second plate.

7. The case frame of claim 1, wherein the board comprises a Printed Circuit Board (PCB).

8. The case frame of claim 1, wherein the first sound device includes one of a microphone or a speaker or a receiver.

9. The case frame of claim 1, wherein the first plate and the second plate are constructed as one unit.

10. A case frame comprising:
    a main hole portion including a first plurality of holes in a first plate of the case frame;
    a second plurality of holes branched from the main hole portion and communicating with the main hole portion in the first plate;
    a third plurality of holes corresponding to the second plurality of holes in a second plate of the case frame; and
    at least one chamber formed between the second plate of the case frame and a board disposed below the second plate of the case frame,
    wherein at least one sound device is disposed in the chamber; and
    wherein the least one chamber includes a fence passing through at least one of the third plurality of holes and extending from the second plate, and a cover sealing the fence.

11. A portable terminal comprising:
    a case frame defining an outer surface of the portable terminal, the case frame comprising:
        a main hole portion including a first plurality of holes in a first plate of the case frame;
        second plurality of holes branched from the main hole portion and communicating with the main hole portion in the first plate;
        a third plurality of holes corresponding to the second plurality of holes in a second plate of the case frame;
        at least one chamber formed between the second plate and a board disposed below the second plate, the at least one chamber comprising a first passage formed by a first one of the third plurality of holes and a second passage formed by a second one of the third plurality of holes; and
    a first sound device and a second sound device disposed within the chamber, the first sound device being configured to communicate with the main hole portion via the first passage and the second sound device being configured to communicate with the main hole portion via the second passage.

12. The portable terminal of 11, wherein the at least one chamber communicates with the third plurality of holes.

13. The portable terminal of claim 11, wherein the least one chamber is disposed on the second plate.

14. The portable terminal of claim 11, wherein the first sound device includes a speaker and the second sound device includes a microphone.

15. The portable terminal of claim 11, wherein the at least one chamber comprises an indented part formed at the second plate, communicating with the third plurality of holes, and housing the first sound device.

16. The portable terminal of claim 11, wherein the at least one chamber is formed by a coupling between the board and the second plate.

17. The portable terminal of claim 11, wherein the board comprises a Printed Circuit Board (PCB).

18. The portable terminal of claim 11, wherein the first sound device includes one of a microphone or a speaker or a receiver.

19. The portable terminal of claim 11, wherein the first plate and the second plate are constructed as one unit.

20. A portable terminal comprising:
   a case frame defining an outer surface of the portable terminal, the case frame comprising:
      a main hole portion including a first plurality of holes in a first plate of the case frame;
      second plurality of holes branched from the main hole portion and communicating with the main hole portion in the first plate;
      a third plurality of holes corresponding to the second plurality of holes in a second plate of the case frame;
      at least one chamber formed between the second plate and a board disposed below the second plate; and
   at least one sound device disposed in the chamber;
wherein the least one chamber includes a fence passing through at least one of the third plurality of holes, and extending from the second plate and a cover sealing the fence.

* * * * *

UNITED STATES PATENT AND TRADEMARK OFFICE
CERTIFICATE OF CORRECTION

| | | |
|---|---|---|
| PATENT NO. | : 8,774,873 B2 | Page 1 of 1 |
| APPLICATION NO. | : 13/887639 | |
| DATED | : July 8, 2014 | |
| INVENTOR(S) | : Jung-Sik Park | |

It is certified that error appears in the above-identified patent and that said Letters Patent is hereby corrected as shown below:

In the Claims

Column 6, Claim 3, Line 1 should read as follows:
--...wherein the at least...--

Column 6, Claim 4, Line 3 should read as follows:
--...The case frame of...--

Column 6, Claim 11, Line 41 should read as follows:
--...a second plurality of...--

Column 6, Claim 12, Line 58 should read as follows:
--...terminal of claim 11...--

Column 6, Claim 13, Line 60 should read as follows:
--...wherein the at least...--

Column 7, Claim 20, Line 18 should read as follows:
--...a second plurality of...--

Signed and Sealed this
Thirtieth Day of September, 2014

Michelle K. Lee
*Deputy Director of the United States Patent and Trademark Office*